US008250226B2

(12) United States Patent (10) Patent No.: US 8,250,226 B2
Saunders et al. (45) Date of Patent: Aug. 21, 2012

(54) GENERATING ONE OR MORE CLIENTS FOR GENERATING ONE OR MORE SYNTHETIC TRANSACTIONS WITH ONE OR MORE WEB SERVICE OPERATIONS

(75) Inventors: Roger C. Saunders, Abingdon (GB); William S. R. Thain, West Lothian (GB)

(73) Assignee: CA, Inc., Islandia, NY (US)

( * ) Notice: Subject to any disclaimer, the term of this patent is extended or adjusted under 35 U.S.C. 154(b) by 984 days.

(21) Appl. No.: 11/186,338

(22) Filed: Jul. 21, 2005

(65) Prior Publication Data

US 2007/0022154 A1 Jan. 25, 2007

(51) Int. Cl.
*G06F 15/16* (2006.01)

(52) U.S. Cl. ....... 709/229; 715/762; 705/26.1; 712/214; 714/763

(58) Field of Classification Search .................. 709/229; 705/26.1; 712/214; 714/763; 715/762
See application file for complete search history.

(56) References Cited

U.S. PATENT DOCUMENTS

| | | | | |
|---|---|---|---|---|
| 5,941,983 A * | 8/1999 | Gupta et al. | ................... | 712/214 |
| 6,028,987 A * | 2/2000 | Hirairi | ........................... | 716/103 |
| 6,275,986 B1 * | 8/2001 | Ewart | ............................. | 717/126 |
| 6,654,793 B1 * | 11/2003 | Wollrath et al. | .............. | 709/217 |
| 6,681,383 B1 * | 1/2004 | Pastor et al. | .................... | 717/126 |
| 6,807,170 B1 * | 10/2004 | Dendi et al. | .................... | 370/354 |
| 6,915,957 B2 * | 7/2005 | Kisliakov | ........................ | 235/492 |
| 6,920,410 B2 * | 7/2005 | Southam et al. | .............. | 702/122 |
| 7,085,762 B2 * | 8/2006 | Medicke et al. | .................. | 707/6 |
| 7,137,100 B2 * | 11/2006 | Iborra et al. | .................. | 717/106 |
| 7,194,529 B2 * | 3/2007 | Kupiec et al. | ................. | 709/223 |
| 7,289,989 B2 * | 10/2007 | Bou-Ghannam et al. | ......... | 707/6 |
| 7,310,783 B2 * | 12/2007 | Pagan | ........................... | 715/840 |
| 7,340,714 B2 * | 3/2008 | Upton | ........................... | 717/102 |
| 7,406,685 B2 * | 7/2008 | Fleehart et al. | ............... | 717/141 |
| 7,516,440 B2 * | 4/2009 | Upton | ........................... | 717/106 |
| 7,546,587 B2 * | 6/2009 | Marr et al. | ..................... | 717/127 |
| 2003/0105884 A1 * | 6/2003 | Upton | ........................... | 709/318 |
| 2003/0135628 A1 * | 7/2003 | Fletcher et al. | ............... | 709/229 |
| 2004/0059940 A1 * | 3/2004 | Birk et al. | ..................... | 713/201 |

(Continued)

FOREIGN PATENT DOCUMENTS

EP 1 523 151 A2 4/2005

OTHER PUBLICATIONS

Developing J2EE Web Services on Fly, Dhesiaseelan, May 23, 2003.*

(Continued)

*Primary Examiner* — David Lazaro
*Assistant Examiner* — Waseem Ashraf
(74) *Attorney, Agent, or Firm* — Baker Botts L.L.P.

(57) ABSTRACT

In one embodiment, a method for generating one or more synthetic transactions with one or more web service operations includes accessing a Web Services Description Language (WSDL) file describing a web service and, according to the WSDL file, generating a symbol table for describing a client for generating one or more synthetic transactions with the web service. The method also includes receiving input from a user specifying one or more operations of the web service for invocation, an order for invoking the operations of the web service, and one or more values of one or more parameters of the operations. The method also includes incorporating the input from the user into the symbol table and generating the client according to the symbol table.

17 Claims, 2 Drawing Sheets

U.S. PATENT DOCUMENTS

| | | | | |
|---|---|---|---|---|
| 2004/0181537 | A1* | 9/2004 | Chawla et al. | 707/100 |
| 2004/0236758 | A1* | 11/2004 | Medicke et al. | 707/100 |
| 2005/0005158 | A1* | 1/2005 | Alaluf | 713/200 |
| 2005/0015433 | A1* | 1/2005 | Nakamura | 709/201 |
| 2005/0038708 | A1* | 2/2005 | Wu | 705/26 |
| 2006/0155807 | A1* | 7/2006 | Loupia et al. | 709/203 |
| 2006/0161833 | A1* | 7/2006 | Chandra et al. | 714/763 |
| 2006/0168115 | A1* | 7/2006 | Loupia et al. | 709/218 |
| 2007/0266328 | A1* | 11/2007 | Vasey | 715/762 |

OTHER PUBLICATIONS

Dhesiaseelan (Developing J2EE 1.4 Web Serives on Fly, May 23, 2003).*

From the International Searching Authority, Patent Cooperation Treaty, "PCT Notification of the International Search Report and the Written Opinion of the International Searching Authority, or the Declaration," International Application No. PCT/US2006/028063, mailed Dec. 13, 2006, 13 pages.

Sahu, M., "XML Development in Java, It's all the Beans," WEB Techniques, Miller Freeman, US, vol. 4, No. 6, pp. 51-55, Jun. 1999.

Glass, G., "The Web Services (r)evolution, Part 4, Web Services Description Language (WSDL)," Internet Citation, [online], pp. 1-11, Feb. 1, 2001, retrieved from the internet Jul. 10, 2003, 11 pages, URL:ftp://www6.software.ibm,com/software/developer/library/ws-peer4.pdf.

* cited by examiner

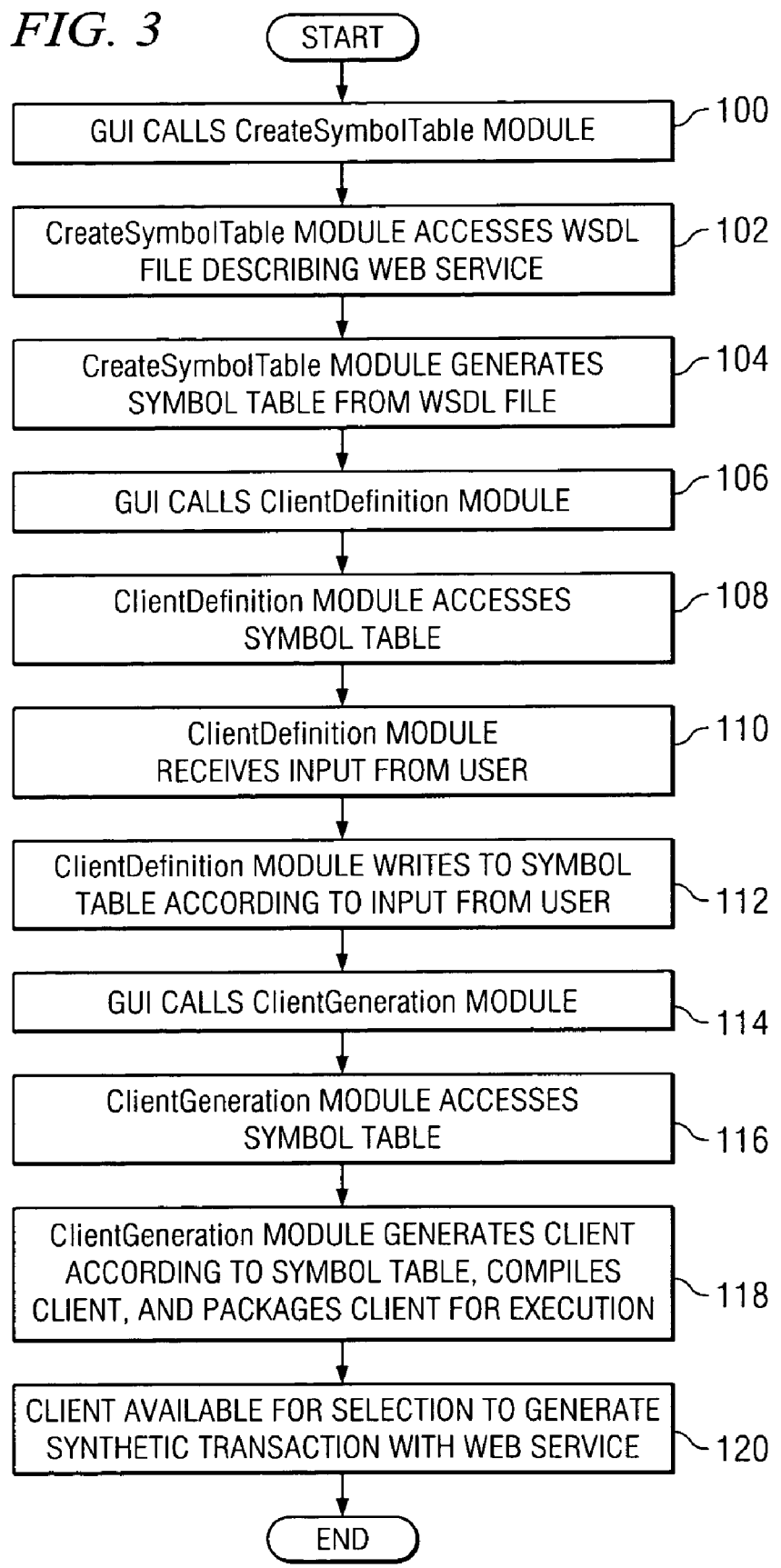

GENERATING ONE OR MORE CLIENTS FOR GENERATING ONE OR MORE SYNTHETIC TRANSACTIONS WITH ONE OR MORE WEB SERVICE OPERATIONS

TECHNICAL FIELD OF THE INVENTION

This invention relates in general to web services and more particularly to generating one or more clients for generating one or more synthetic transactions with one or more web service operations.

BACKGROUND OF THE INVENTION

Code for interacting with a web service to measure and analyze performance of the web service is typically hand written by a programmer. Writing such code typically requires, on the part of the programmer, significant experience with and knowledge of programming and significant knowledge of a Web Services Description Language (WSDL) file describing the web service.

SUMMARY OF THE INVENTION

Particular embodiments of the present invention may reduce or eliminate problems and disadvantages associated with web services.

In one embodiment, a method for generating one or more synthetic transactions with one or more web service operations includes accessing a WSDL file describing a web service and, according to the WSDL file, generating a symbol table for describing a client for generating one or more synthetic transactions with the web service. The method also includes receiving input from a user specifying one or more operations of the web service for invocation, an order for invoking the operations of the web service, and one or more values of one or more parameters of the operations. The method also includes incorporating the input from the user into the symbol table and generating the client according to the symbol table.

Particular embodiments of the present invention provide one or more technical advantages. As an example, particular embodiments facilitate automatic generation of clients for generating synthetic transactions with web services. Particular embodiments facilitate generation of clients for generating synthetic transactions with web services by users lacking significant experience with or knowledge of programming. Particular embodiments facilitate generation of clients for generating synthetic transactions with web services by users lacking significant knowledge of WSDL files describing the web services. Particular embodiments are encodeable in application server deployment files and deployable to applications servers, such as, for example, JBOSS application servers. Particular embodiments facilitate generation of clients for generating synthetic transactions with web services that are capable of invoking sequences of operations of web services.

Particular embodiments may provide all, some, or none of these technical advantages. Particular embodiments may provide one or more other technical advantages, one or more of which may be readily apparent to a person having ordinary skill in the art from the figures, descriptions, and claims herein.

BRIEF DESCRIPTION OF THE DRAWINGS

To provide a more complete understanding of the present invention and features and advantages thereof, reference is made to the following description, taken in conjunction with the accompanying drawings, in which:

FIG. 3. illustrates an example method for generating one or more clients for generating one or more synthetic transactions with one or more web service operations.

DESCRIPTION OF EXAMPLE EMBODIMENTS

Figure 1:
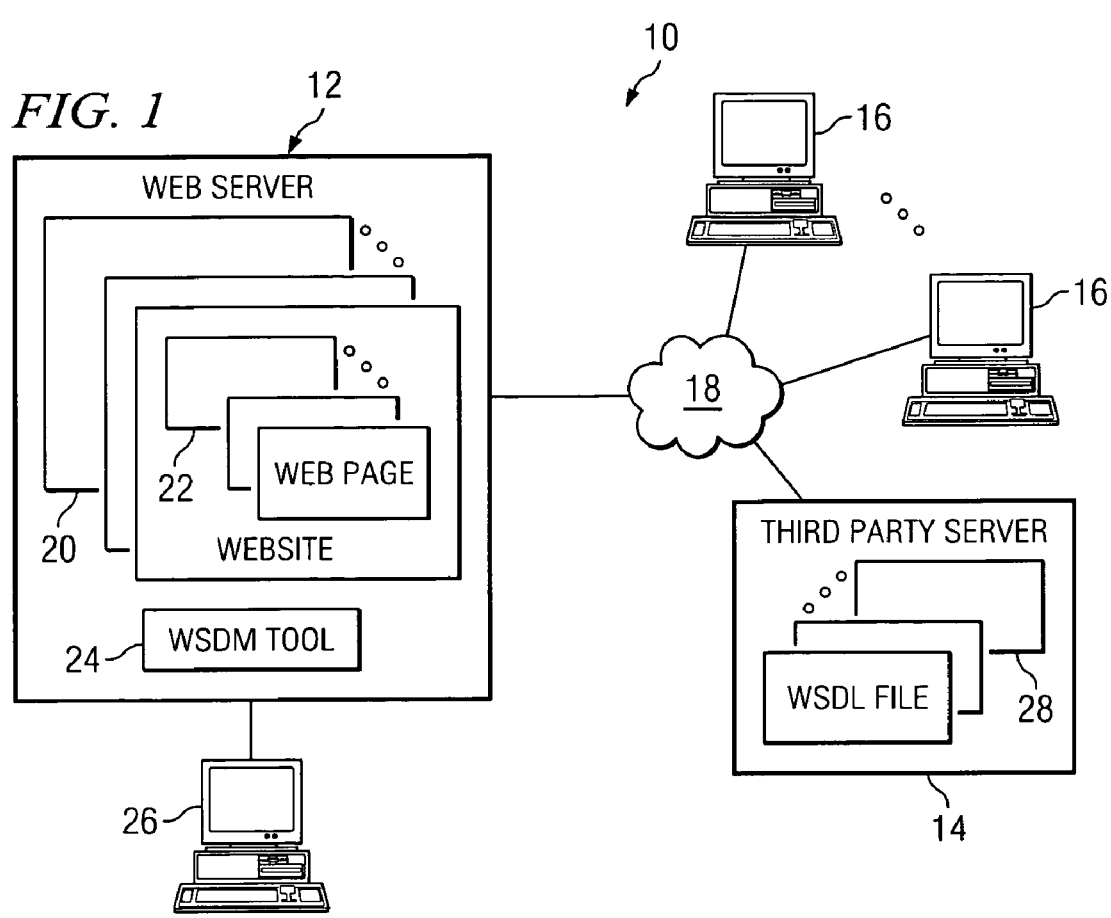
FIG. 1 illustrates an example system for generating one or more clients for generating one or more synthetic transactions with one or more web service operations.

FIG. 1 illustrates an example system 10 for generating one or more clients for generating one or more synthetic transactions with one or more web service operations. System 10 includes a web server 12, a third party server 14, and one or more user systems 16. A network 18 couples web server 12, third party server 14, and user systems 16 to each other. The present invention contemplates any suitable network 18. As an example and not by way of limitation, network 18 may include a local area network (LAN), a metropolitan area network (MAN), a wide area network (WAN), a portion of the Internet, or another network 18 or a combination of two or more such networks 18.

Web server 12 includes a hardware, software, or embedded logic component or a combination of two or more such components hosting or otherwise supporting one or more websites 20. Web server 12 includes one or more websites 20. In particular embodiments, one or more applications servers support web server 12. Websites 20 hosted at web server 12 are accessible to one or more users at one or more user systems 16 via network 18. Each website 20 includes one or more web pages 22. Reference to a website 20 encompasses one or more websites 20, one or more web pages 22, or both, where appropriate. Reference to a web page 22 encompasses one or more websites 20, one or more web pages 22, or both, where appropriate. In particular embodiments, a user at a user system 16 enters a particular uniform resource locator (URL) or other electronic address to establish a connection to web server 12 and access a particular web page 22 associated with a particular website 20 hosted at web server 12. Server 12 communicates web page 22 to user system 16 via network 18, and user system 16 displays web page 22 to the user. In particular embodiments, to access another web page 22, the user at user system 16 enters another URL to access other web page 22. As an example and not by way of limitation, the user may select an icon on web page 22 linking to other web page 22 and, in response, web server 12 may communicate other web page 22 to user system 16 for display to the user. The user at user system 16 may enter multiple URLs to navigate across multiple web pages 22, according to particular needs. In particular embodiments, one or more web pages 22 at web server 12 require authentication from a user before web server 12 will provide the user access to web pages 22.

Web server 12 also includes a WSDM tool 24. WSDM tool 24 includes a hardware, software, or embedded logic component or a combination of two or more such components for monitoring web services provided through web pages 22 at web server 12. As an example and not by way of limitation, WSDM tool 24 may include functionality for automatically discovering and cataloging web services added to web pages 22 at web server 12, monitoring performance of operations of the web services and otherwise gathering information on the web services, and, in the event of one or more problems with one or more of the web services, notifying an administrator of the problems. An operation of a web service includes one or more operations of the web service. An administrator system 26 includes a hardware, software, or embedded logic component or a combination of two or more such components enabling one or more administrators to provide input to and receive output from web server 12 for purposes of operating web server 12. As an example and not by way of limitation, administrator system 26 may include a desktop computer system, a laptop computer system, a personal digital assistant (PDA), or another computer system or a combination of two or more such computer systems coupled to web server 12 via one or more links that may each include one or more wires in one or more circuit boards, one or more internal or external buses, one or more wireless links, one or more optical links, one or more wireline links, one or more LANs, one or more MANs, one or more WANs, one or more portions of the Internet, or a combination of two or more such links, according to particular needs. Administrator system 26 includes one or more administrator systems 26.

Third party server 14 includes a hardware, software, or embedded logic component or a combination of two or more such components hosting or otherwise supporting one or more web services. Third party server 14 includes one or more third party servers 14. In particular embodiments, a first entity operates web server 12 and a second entity independent of the first entity operates third party server 14. Example entities that run third party servers 14 hosting or otherwise supporting web services include MICROSOFT and AMAZON. In particular embodiments, web services reside at one or more application servers that possibly support one or more web servers. One or more WSDL files 28 at third party server 14 describe the web services. In particular embodiments, one WSDL file 28 describes one web service. A WSDL file 28 includes one or more WSDL files 28, and a web service includes one or more web services. The present invention contemplates any suitable web services providing any suitable functionalities. As an example and not by way of limitation, a web service may provide functionality for generating a map according to input from a user at a user system 16. A user at user system 16 may access a web page 22 at web server 12 providing access to the web service, enter an address into one or more text boxes or other components of web page 22 for providing input to the web service, and select an icon on web page 22 requesting a map of an area including the address. In response to the user selecting the icon, web server 12 may generate a request for the map and communicate the request to third party server 14. The request may include the address entered by the user and possibly other input from the user.

In response to the request, third party server 14 may access a WSDL file 28 at third party server 14 describing the web service for generating the requested map and, using WSDL file 28 and the input from the user, generate the requested map. Third party server 14 may then communicate the requested map to web server 12, and web server 12 may communicate the requested map to user system 16 for display to the user. In particular embodiments, instead of third party server 14 communicating the requested map to web server 12 for communication to user system 16, third party server 14 may communicate the requested map directly to user system 16 for display to the user. In particular embodiments, instead of third party server 14 generating the requested map in response to the request from web server 12 and communicating the requested map to web server 12 or user system 16, third party server 14 may communicate an instance of WSDL file 28 describing the web service for generating the requested map to web server 12. Web server 12 may then generate the requested map at web server 12 using WSDL file 28 and the input from the user and communicate the requested map to user system 16 for display to the user.

Although particular web services are illustrated and described, the present invention contemplates any suitable web services. Although particular interactions among particular components of system 10 for delivering particular web services to particular users are described and illustrated, the present invention contemplates any suitable interactions among any suitable components of system 10 delivering any suitable web services to any suitable users.

A user system 16 includes a hardware, software, or embedded logic component or a combination of two or more such components enabling one or more users to communicate with one or more of web server 12, third party 14, and one or more other user systems 16, as described above. As an example and not by way of limitation, a user system 16 may include a desktop computer system, a laptop computer system, a personal digital assistant (PDA), or another computer system or a combination of two or more such computer systems coupled to web server 12 via one or more links that may each include one or more wires in one or more circuit boards, one or more internal or external buses, one or more wireless links, one or more optical links, one or more wireline links, one or more LANs, one or more MANs, one or more WANs, one or more portions of the Internet, or a combination of two or more such links, according to particular needs. A user system 16 includes one or more user systems 16.

Figure 2:
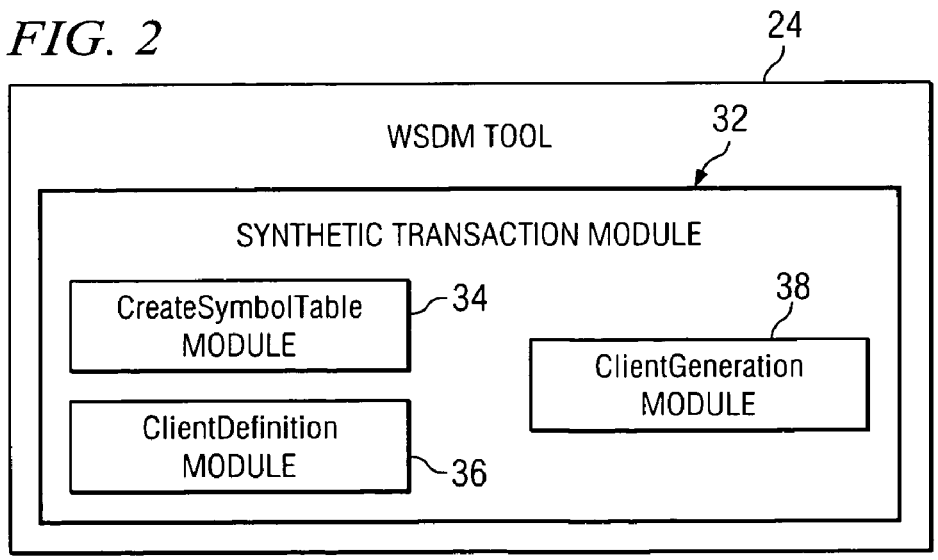
FIG. 2 illustrates an example web services distributed management (WSDM) tool in the system illustrated in FIG. 1.

FIG. 2 illustrates and example WSDM tool 24. WSDM tool 24 includes a synthetic transaction module 32 that includes a hardware, software, or embedded logic component or a combination of two or more such components for invoking operations of web services. In particular embodiments, to invoke an operation of a web service, synthetic transaction module 32 generates a client including one or more software components for invoking the operation. In particular embodiments, a client is a JAVA class including one or more calls to one or more operations of a web service according to one or more values of one or more parameters. A client includes one or more clients. In particular embodiments, a client is a managed bean (MBean) that is compliant with Java Management Extensions (JMX) and deployable to an application server that is also compliant with JMX (such as, for example, a JBOSS application server). Reference to a "synthetic transaction" encompasses invocation of one or more operations of a web service, where appropriate. In particular embodiments, a server-side observer does not trap a synthetic transaction with a web service before the synthetic transaction reaches the web service. In particular embodiments, to use synthetic transaction module 32 to invoke operations of web services, a user at administrator system 26 need not have significant experience with or knowledge of programming. In particular embodiments, to use synthetic transaction module 32 to invoke operations of web services, a user at administrator system 26 need not have significant knowledge of WSDL files 28 describing the web services.

In particular embodiments, synthetic transaction module 32 resides in an application server deployment file, which enables deployment of synthetic transaction module 32 to an application server (such as, for example, a JBOSS application server). In particular embodiments, to facilitate a synthetic transaction, synthetic transaction module 32 executes three phases—CreateSymbolTable, ClientDefinition, and ClientGeneration—that communicate with each other via one or more serialized JAVA classes, one or more deserialized JAVA classes, or both. Reference to a "symbol table" encompasses JAVA classes used for communicating between or among such phases, where appropriate. In particular embodiments, a symbol table is a serialized tree of JAVA objects that represents a parsed WSDL file 28 and a sequence of operations of a web service described in WSDL file 28. In particular embodiments, a graphical user interface (GUI) controls initiation of each phase, which allows selection of a WSDL file 28 (or a symbol table) and facilitates scheduling of synthetic transactions with a web service described in the WSDL file 28 (or the symbol table) for execution.

In particular embodiments, during CreateSymbolTable, synthetic transaction module 32 parses a WSDL file 28. Such parsing includes generating code for calling a web service described in WSDL file 28 and constructing a symbol table according to WSDL file 28 for input to ClientDefinition. In particular embodiments, during ClientDefinition, a user at administrator system 26 provides input specifying one or more operations of the web service for invocation, an order for invoking the operations, and one or more values of one or more parameters of the operations. Synthetic transaction module 32 updates the symbol table according to the input from the user. In particular embodiments, during ClientGeneration, synthetic transaction module 32 generates code that implements the client described in the symbol table, compiles the client, and packages the client for execution. The client includes one or more calls to the operations specified by the user according to the values of the parameters specified by the user in the order specified by the user. After ClientGeneration, the client is available for selection to generate one or more synthetic transactions. In particular embodiments, a client generated during ClientGeneration is capable of invoking multiple operations of a web service in a specified order. In some such embodiments, the client is capable of using output from one or more first operations earlier in the sequence to invoke one or more second operations later in the sequence. In some such embodiments, the client is capable of receiving, during the sequence, input from a user at administrator system 26 and using the input to invoke one or more operations in the sequence.

Synthetic transaction module 32 includes a CreateSymbolTable module 34, a ClientDefinition module 36, and a ClientGeneration module 38. In particular embodiments, CreateSymbolTable module 34, ClientDefinition module 36, and ClientGeneration module 38 are separate from each other. In particular embodiments, one or more components of synthetic transaction module 32 collectively include one or more components of each of two or more of CreateSymbolTable module 34, ClientDefinition module 36, and ClientGeneration module 38. In particular embodiments, CreateSymbolTable module 34 and ClientGeneration module 38 have command line interfaces and a GUI controls CreateSymbolTable module 34, ClientDefinition module 36, and ClientGeneration module 38. In particular embodiments, input to synthetic transaction module 32 includes a WSDL file 28 describing a web service for invocation. In particular embodiments, output from synthetic transaction module 32 includes a .sar file including a test client and generated stubs and associated beans for invoking one or more operations of the web service described in the WSDL file 28. The .sar file also includes a jboss-service.xml file to control loading onto a JBOSS application server. Synthetic transaction module 32 uses a symbol table to pass information from one component of synthetic transaction module 32 to one or more other components of synthetic transaction module 32.

CreateSymbolTable module 34 handles CreateSymbolTable. In particular embodiments, CreateSymbolTable module 34 is an extension of an AXIS WSDL2Java class. Synthetic transaction module 32 uses one or more facilities of AXIS to generate stubs and beans for calling operations of web services described in WSDL files 28. The extended code then processes an AXIS SymbolTable object produced by an AXIS parser to produce a WSDM symbol table, which synthetic transaction module 32 serializes to disk. To invoke CreateSymbolTable module 34, synthetic transaction module 32 specifies a WSDL file 28 and one or more configuration parameters from either a GUI (which is often the case) or a command line interface (which is often the case during testing and bulk loading of synthetic transaction module 32).

ClientDefinition module 36 handles ClientDefinition. In particular embodiments, to invoke a GUI associated with ClientDefinition module 36, synthetic transaction module 32 specifies a symbol table edited by a previous invocation of ClientDefinition module 36 or processed by CreateSymbolTable module 34. The GUI enables a user at administrator system 26 to edit a possibly empty sequence of operations. In particular embodiments such editing includes selecting from operations defined in the symbol table and editing one or more values of one or more parameters of one or more operations in the sequence. The user specifies values of parameters for each operation in the sequence before synthetic transaction module 32 proceeds to ClientGeneration. In particular embodiments, one or more parameters of one or more subsequent operations in the sequence references one or more results of one or more previous operations in the sequence. A deletion or a reordering of one or more portions of the sequence causes synthetic transaction module 32 to check whether such references are still valid before synthetic transaction module 32 will permit any actions relying on such references.

ClientGeneration module 38 handles ClientGeneration. In particular embodiments, to invoke ClientGeneration module 38, synthetic transaction module 32 specifies a symbol table processed by ClientDefinition module 36. ClientGeneration module 38 then uses information in a WSDMClient object (which includes both an object describing a client for generating a synthetic transaction and a symbol table) and information in a sequence of WSDMOperations (each of which include an object representing an operation of a web service and one or more parameters of the operation) to write a JAVA source file for calling the operations selected by the user during ClientDefinition. ClientGeneration module 38 also writes a jboss-service.xml file and an MBean interface for the JAVA source file. ClientGeneration module 38 compiles the JAVA source file and, if the compilation is successful, generates a .sar file including the JAVA source file, the jboss-service.xml file, and the MBean interface. If one or more errors occur during the compilation, synthetic transaction module 32 returns information on the errors to one or more programs calling synthetic transaction module 32. In particular embodiments, ClientGeneration module 38 is invocable from a command line for testing, but normally invoked from ClientDefinition module 36.

FIG. 3 illustrates an example method for generating one or more clients for generating one or more synthetic transactions with one or more web service operations. The method begins at step 100, where a GUI calls CreateSymbolTable module 34. In particular embodiments, the GUI calls CreateSymbolTable module 34 in response to input from a user at administrator system 26. At step 102, CreateSymbolTable module 34 accesses a WSDL file 28 describing a web service. At step 104, CreateSymbolTable module 34 generates a symbol table from WSDL file 28. At step 106, the GUI calls ClientDefinition module 36. At step 108, ClientDefinition module 36 accesses the symbol table. At step 110, ClientDefinition module 36 receives input from the user at administrator system 26. At step 112, ClientDefinition module 36 writes to the symbol table according to the input from the user at administrator system 26. At step 114, the GUI calls ClientGeneration module 38. At step 116, ClientGeneration module 38 accesses the symbol table. At step 118, ClientGeneration module 38 generates a client according to the symbol table, compiles the client, and packages the client for execution. At step 120, the client is available for selection to generate one or more synthetic transactions with the web service described in WSDL file 28, at which point the method ends.

Although particular steps of the method illustrated in FIG. 3 are illustrated and described as occurring in a particular order, the present invention contemplates any suitable steps of the method illustrated in FIG. 3 occurring in any suitable order.

Particular embodiments have been used to describe the present invention, and a person having ordinary skill in the art may comprehend one or more changes, substitutions, variations, alterations, or modifications to the particular embodiments used to describe the present invention. The present invention encompasses all such changes, substitutions, variations, alterations, and modifications within the scope of the appended claims.

What is claimed is:

1. A system for generating one or more clients for generating one or more synthetic transactions with one or more web service operations, the system comprising: a first module operable to: access a Web Services Description Language (WSDL) file describing a web service; and according to the WSDL file, generate a symbol table for describing a client for generating one or more synthetic transactions with the web service, wherein the symbol table comprises a serialized tree of JAVA objects representing a parsed version of the WSDL file and capable of representing a sequence of the operations of the web service for invocation; a second module operable to: access the symbol table, wherein the symbol table has been edited by a previous invocation of the second module; invoke a user interface operable to receive input from a user indicating: one or more operations of the web service for invocation, wherein output from a first one of the operations of the web service is operable to invoke a second one of the operations of the web service; an order for invoking the operations of the web service; and one or more values of one or more parameters of the operations; verify whether one or more references to results of one or more previous operations is valid; verify whether the one or more values of the one or more parameters are valid; deny invocation of the one or more operations if the one or more references to the results of the one or more previous operations is invalid; deny invocation of the one or more operations if any of the one or more values of the one or more parameters are invalid; and access the symbol table; and incorporate the input from the user into the symbol table; and a third module operable to: access the symbol table; generate source code operable to implement the client according to the symbol table; compile the client; and package the client for execution.

2. The system of claim 1, wherein the first, second, and third modules reside in an application server deployment file deployable to an application server.

3. The system of claim 2, wherein the application server is a JBOSS application server.

4. The system of claim 1, wherein:
the first module comprises a CreateSymbolTable module;
the second module comprises a ClientDefinition module; and
the third module comprises a ClientGeneration module.

5. The system of claim 1, wherein:
a synthetic transaction module comprises the first, second, and third modules; and
a web services distributed management (WSDM) tool comprises the synthetic transaction module.

6. The system of claim 1, wherein the WSDL file comprises a WSDL file from a third party server providing web services.

7. A method for generating one or more clients for generating one or more synthetic transactions with one or more web service operations, the method comprising: accessing a Web Services Description Language (WSDL) file describing a web service; according to the WSDL file, generating a symbol table for describing a client for generating one or more synthetic transactions with the web service, wherein the symbol table comprises a serialized tree of JAVA objects representing a parsed version of the WSDL file and capable of representing a sequence of the operations of the web service for invocation; accessing the symbol table, wherein the symbol table has been edited by a previous invocation of the second module; invoking a user interface operable to receive input from a user indicating: one or more operations of the web service for invocation, wherein output from a first one of the operations of the web service is operable to invoke a second one of the operations of the web service; an order for invoking the operations of the web service; and one or more values of one or more parameters of the operations; verifying whether one or more references to results of one or more previous operations is valid; verifying whether the one or more values of the one or more parameters are valid; denying invocation of the one or more operations if the one or more references to the results of the one or more previous operations is invalid; denying invocation of the one or more operations if any of the one or more values of the one or more parameters are invalid; incorporating the input from the user into the symbol table; generating source code operable to implement the client according to the symbol table; compiling the client; and packaging the client for execution.

8. The method of claim 7, executable from an application server deployment file deployable to an application server.

9. The method of claim 8, wherein the application server is a JBOSS application server.

10. The method of claim 7, executable by a synthetic transaction module in a web services distributed management (WSDM) tool.

11. The method of claim 7, wherein the WSDL file comprises a WSDL file from a third party server providing web services.

12. A non-transitory, computer readable medium comprising logic for generating one or more clients for generating one or more synthetic transactions with one or more web service operations, the logic operable, when executed by a processor, to: access a Web Services Description Language (WSDL) file describing a web service; according to the WSDL file, generate a symbol table for describing a client for generating one or more synthetic transactions with the web service, wherein the symbol table comprises a serialized tree of JAVA objects representing a parsed version of the WSDL file and capable of representing a sequence of the operations of the web service for invocation; access the symbol table, wherein the symbol table has been edited by a previous invocation of the second module; invoke a user interface operable to receive input from a user indicating: one or more operations of the web service for invocation, wherein output from a first one of the operations of the web service is operable to invoke a second one of the operations of the web service; an order for invoking the operations of the web service; and one or more values of one or more parameters of the operations; verify whether one or more references to results of one or more previous operations is valid; verify whether the one or more values of the one or more parameters are valid; deny invocation of the one or more operations if the one or more references to the results of the one or more previous operations is invalid; deny invocation of the one or more operations if any of the one or more values of the one or more parameters are invalid; incorporate the input from the user into the symbol table; generate source code operable to implement the client according to the symbol table; compile the client; and package the client for execution.

13. The computer readable medium of claim 12, encoded in an application server deployment file deployable to an application server.

14. The computer readable medium of claim 13, wherein the application server is a JBOSS application server.

15. The computer readable medium of claim 12, provided by a synthetic transaction module in a web services distributed management (WSDM) tool.

16. The computer readable medium of claim 12, wherein the WSDL file comprises a WSDL file from a third party server providing web services.

17. A system for generating one or more clients for generating one or more synthetic transactions with one or more web service operations, the system comprising: means for accessing a Web Services Description Language (WSDL) file describing a web service; means for, according to the WSDL file, generating a symbol table for describing a client for generating one or more synthetic transactions with the web service, wherein the symbol table comprises a serialized tree of JAVA objects representing a parsed version of the WSDL file and capable of representing a sequence of the operations of the web service for invocation; means for accessing the symbol table, wherein the symbol table has been edited by a previous invocation of the second module; means for invoking a user interface operable to receive input from a user indicating: one or more operations of the web service for invocation, wherein output from a first one of the operations of the web service is operable to invoke a second one of the operations of the web service; an order for invoking the operations of the web service; and one or more values of one or more parameters of the operations; means for verifying whether one or more references to results of one or more previous operations is valid; means for verifying whether the one or more values of the one or more parameters are valid; means for denying invocation of the one or more operations if the one or more references to the results of the one or more previous operations is invalid; means for denying invocation of the one or more operations if any of the one or more values of the one or more parameters are invalid; means for incorporating the input from the user into the symbol table; means for generating source code operable to implement the client according to the symbol table; means for compiling the client; means for packaging the client for execution; and means for making the client available for generating one or more synthetic transactions with the web service.

* * * * *

UNITED STATES PATENT AND TRADEMARK OFFICE
CERTIFICATE OF CORRECTION

PATENT NO. : 8,250,226 B2
APPLICATION NO. : 11/186338
DATED : August 21, 2012
INVENTOR(S) : R. Saunders et al.

Page 1 of 1

It is certified that error appears in the above-identified patent and that said Letters Patent is hereby corrected as shown below:

Title Page 2, Item (56) References Cited, Other Publications, (Column 1, line 12), please change "Serives" to --Services--

Signed and Sealed this
Sixth Day of August, 2013

Teresa Stanek Rea
*Acting Director of the United States Patent and Trademark Office*